US010442872B2

(12) United States Patent
Besse et al.

(10) Patent No.: US 10,442,872 B2
(45) Date of Patent: Oct. 15, 2019

(54) BIOSOURCED POLYMER FOR MANUFACTURING, VIA CATALYTIC CARBONATION, A NON-BITUMINOUS POLYHYDROXYURETHANE BINDER FOR ROADWAY OR CIVIL ENGINEERING-RELATED USES

(71) Applicant: COLAS, Boulogne-Billancourt (FR)

(72) Inventors: Vincent Besse, Chelles (FR); Sylvain Caillol, Montpellier (FR); Ghislain David, Montpellier (FR); Nicolas Illy, Courbevoie (FR)

(73) Assignee: COLAS, Paris (FR)

( * ) Notice: Subject to any disclaimer, the term of this patent is extended or adjusted under 35 U.S.C. 154(b) by 112 days.

(21) Appl. No.: 15/552,836

(22) PCT Filed: Feb. 22, 2016

(86) PCT No.: PCT/FR2016/050404
§ 371 (c)(1),
(2) Date: Aug. 23, 2017

(87) PCT Pub. No.: WO2016/135404
PCT Pub. Date: Sep. 1, 2016

(65) Prior Publication Data
US 2018/0037673 A1 Feb. 8, 2018

(30) Foreign Application Priority Data

Feb. 23, 2015 (FR) ..................... 15 51536

(51) Int. Cl.
*C08B 37/08* (2006.01)
*C08G 71/04* (2006.01)
*C08L 95/00* (2006.01)
*C08L 5/08* (2006.01)
*C04B 26/16* (2006.01)
*C04B 26/22* (2006.01)

(52) U.S. Cl.
CPC ............ *C08B 37/003* (2013.01); *C08G 71/04* (2013.01); *C08L 5/08* (2013.01); *C08L 95/005* (2013.01); *C04B 26/16* (2013.01); *C04B 26/22* (2013.01)

(58) Field of Classification Search
CPC ......... C08B 37/003; C08G 71/04; C08L 5/08; C08L 95/005; C04B 26/22
USPC ......................................................... 524/27
See application file for complete search history.

(56) References Cited

U.S. PATENT DOCUMENTS

| | | | |
|---|---|---|---|
| 2009/0143545 A1 | 6/2009 | Guerret et al. | |
| 2014/0191156 A1* | 7/2014 | Marks | C07D 317/40 252/182.23 |

FOREIGN PATENT DOCUMENTS

| | | |
|---|---|---|
| FR | 2 876 382 A1 | 4/2006 |
| WO | 2006/103371 A2 | 10/2006 |
| WO | 2013/028292 A1 | 2/2013 |

OTHER PUBLICATIONS

Zhao et al., Journal of Molecular Catalysis A:Chemical, 271, 284-289, 2007. (Year: 2007).*
Mourya et al., Reactive & Functional Polymers, 68, 1013-1051, 2008. (Year: 2008).*
Zhao et al.: "Quaternary ammonium salt-functionalized chitosan: An easily recyclable catalyst for efficient synthesis of cyclic carbonates from epoxides and carbon dioxide", Journal of Molecular Catalysis A: Chemical, Elsevier, Amsterdam, NL, vol. 271, No. 1-2, May 10, 2007 (May 10, 2007), pp. 284-289, XP022070260, ISSN: 1381-1169, DOI: 10.1016/J.MOLCATA.2007.03.047.
Zhao et al.: "Dimethyl carbonate synthesis via transesterification catalyzed by quaternary ammonium salt functionalized chitosan", Chinese Chemical Letters, Elsevier Ltd, GB, vol. 19, No. 3, Feb. 7, 2008 (Feb. 7, 2008), pp. 286-290, XP022483527, ISSN: 1001-8417, DOI: 10.1016/J.CCLET.2007.12.033.
Jose Tharun et al.: "A novel approach of utilizing quaternized chitosan as a catalyst for the eco-friendly cycloaddition of epoxides with CO2", Catalysis Science & Technology, vol. 2, No. 8, Jan. 1, 2012 (Jan. 1, 2012), United Kingdom, pp. 1674, XP055236594, ISSN: 2044-4753, DOI: 10.1039/c2cy20137b.
Jose Tharun et al.: "Microwave assisted preparation of quaternized chitosan catalyst for the cycloaddition of CO2 and epoxides", Catalysis Communications, vol. 31, Jan. 1, 2013 (Jan. 1, 2013), NL, pp. 62-65, XP055236602, ISSN: 1566-7367, DOI: 10.1016/j.catcom.2012.11.018.
Song Jinliang et al.: "Highly efficient synthesis of cyclic carbonates from CO2 and epoxides catalyzed by KI/ lecithin", Catalysis Today, vol. 183, No. 1, Mar. 20, 2012 (Mar. 20, 2012), pp. 130-135, XP028902807, ISSN: 0920-5861, DOI: 10.1016/J.CATTOD.2011.08.042.
Zhang Hu et al.: "Quaternized Chitosan as an Efficient Catalyst for Synthesis of N-alkylthio-phthalimides", International Journal of Chemistry, vol. 2, No. 2, Jul. 20, 2010 (Jul. 20, 2010), Toronto, pp. 213-217, XP055236732, ISSN: 1916-9698, DOI: 10.5539/ijc.v2n2p213.
Melanie Chtchigrovsky et al.: "Functionalized Chitosan as a Green, Recyclable, Biopolymer-Supported Catalyst for the [3+2] Huisgen Cycloaddition", Angewandte Chemie International Edition, vol. 48, No. 32, Jul. 2, 2009 (Jul. 2, 2009), pp. 5916-5920, XP055016767, ISSN: 1433-7851, DOI: 10.1002/anie.200901309.

(Continued)

*Primary Examiner* — Hui H Chin
(74) *Attorney, Agent, or Firm* — Young & Thompson

(57) ABSTRACT

Disclosed is a biosourced polymer obtained by dual chemical functionalization of chitosan, usable for catalytic carbonation of cyclic ethers by carbon dioxide, and a binder composition for creating layers and/or coatings for road construction and/or civil engineering, marking materials, or sealing or insulation materials. The composition contains a polyhydroxyurethane polymer binder resulting from the reaction of at least one polyamine with at least one polycyclocarbonate. The polycyclocarbonate was obtained by carbonating a (cyclic) poly(ether) with carbon dioxide catalyzed by the biosourced polymer.

17 Claims, No Drawings

(56) References Cited

OTHER PUBLICATIONS

Maxence Fache et al.: "Vanillin, a promising biobased building-block for monomer synthesis", Green Chemistry, Received Dec. 23, 2013, Accepted Feb. 18, 2014, 2014, 16, 1987-1998 | 1987, The Royal Society of Chemistry 2014.

Vincent Besse et al.: "Synthesis and Applications of Unsaturated Cyclocarbonates", Created Using the RSC Report Template (Ver. 3.1), The Royal Society of Chemistry.

Khaled D. Khalil et al.: "Chitosan as an eco-friendly heterogeneous catalyst for Michael type addition reactions. A simple and efficient route to pyridones and phthalazines", European Journal of Chemistry 1 (4) (2010) 252-258, ISSN 2153-2249.

Khaled D. Khalil et al.: "Chitosan Based Heterogeneous Catalyses: Chitosan-Grafted-Poly(4-Vinylpyridne) as an Efficient Catalyst for Michael Additions and Alkylpyridazinyl Carbonitrile Oxidation", Molecules 2013, 18, 5288-5305, ISSN 1420-3049.

International Search Report, dated May 31, 2016, from corresponding PCT/FR2016/050404 application.

* cited by examiner

BIOSOURCED POLYMER FOR MANUFACTURING, VIA CATALYTIC CARBONATION, A NON-BITUMINOUS POLYHYDROXYURETHANE BINDER FOR ROADWAY OR CIVIL ENGINEERING-RELATED USES

The invention relates generally to an organic synthetic non-bituminous polyhydroxyurethane binder and the use thereof in the production of materials for building and/or public works, and in particular materials for making road construction and/or civil engineering layers and/or coatings. The invention also relates to materials and products incorporating this binder, a method for its manufacture and a catalyst for carbonating cyclic ethers with carbon dioxide for use in particular in the manufacture of this binder.

The binders used in road and para road construction are generally based on bitumen, derived from the processing of petroleum. These binders are therefore made from so-called non-renewable raw materials because oil is a resource of fossil origin.

Bitumen is used in various applications due to its binding capacity. Indeed, it adheres to most common materials such as stone, concrete, wood, metals and glass. In addition, it is an excellent thermal and dielectric insulator.

Today, most roads are coated with asphalt mixes that have demonstrated their ability to meet the requirements of the application on the one hand and the stresses related to traffic and weather conditions on the other. These mixes consist of aggregates bound together by bitumen or bitumen modified by the addition of additives, especially elastomers and/or thermoplastic polymers.

Aggregates bound by bitumen are also used in the building and public works to form among other sealing screeds, sidewalk coverings, riprap, engineering structure coatings. The bitumen is moreover used in so-called industrial applications such as sealing, thermal or sound insulation.

The risk of oil resource depletion has generated a need to develop new non-bituminous synthetic binders as an alternative in various applications to binders traditionally used, which are composed of non-renewable elements and further contain polycyclic aromatic hydrocarbons (PAHs). These non-bituminous synthetic binders have the added advantage of providing coatings colored under contract.

Polyurethane binders are known, and their preparation generally uses reagents of isocyanate type. However, some key isocyanate monomers, such as, for example, methylene diphenyl-4,4'-diisocyanate (MDI), toluene diisocyanate (TDI), hexamethylene diisocyanate (HDI) and isophorone diisocyanate (IPDI), were classified as toxic compounds and CMR (Carcinogenic, mutagenic and reprotoxic). The average values for occupational exposure in France are regulated at a maximum concentration of 0.01 ppm for TDI and MDI. MDI is, moreover, included in Annex XVII of the REACH European regulation, which defines the restrictions on the manufacture, marketing and use of certain dangerous substances and certain dangerous mixtures and items. These isocyanates are themselves made from a chemistry utilizing, for the formation of NCO functions, phosgene which is highly corrosive and toxic and is used especially in poison gas from the early 20th century. Thermal degradation of the polyurethanes also produces hydrocyanic acid and/or may reform isocyanates.

Polyurethanes thus suffer a huge disadvantage while they represent the 6th best-selling material in the world with 14 million tons per year.

This justifies the development of polyurethane resins formed without using reagents of isocyanate type, such as polyhydroxyurethane (PHU) resins, obtained by reacting a polyamine with a polycyclocarbonate, and which comprise alcohol functions on the polyurethane chain. Several structurally different compounds may be obtained in such a reaction, according to opening of the cyclic carbonate with the amine. A mixture of secondary alcohols and primary alcohols is then obtained. They are sometimes referred to as "green" polyurethanes or "isocyanate-free" polyurethanes.

In addition, compared to conventional polyurethanes, the polyhydroxyurethanes generally demonstrate improved chemical and thermal resistance. Generally, the polyhydroxyurethanes have quite low glass transition temperatures, which allow the use as binder for road construction or building to be considered.

The cyclocarbonate synthesis and applications are described especially in the journal Polym. Chem. 2013, 4, 4545-4561. The cyclocarbonates, which generally comprise a 5 or 6-membered ring, can be obtained by various synthetic pathways, including by reacting 1,2-diols or 1,3-diols with phosgene or derivatives thereof, by transcarbonation reaction between a 1,2-diol or 1,3-diol with a dialkyl or diaryl carbonate optionally in the presence of a metallic or organic catalyst, by polycarbonate depolymerization in the presence of a metallic chloride-type catalyst, or by so-called "carbonation" reaction of a poly(cyclic ether) with carbon dioxide ($CO_2$), which consists in a chemical insertion of $CO_2$ (cycloaddition) in the cyclic ether function. This synthetic pathway is very interesting because carbon dioxide is a raw material available in abundance.

A typical example of such a reaction is that of the catalytic reaction between $CO_2$ and oxiranes (epoxides), which leads as a result of ring expansion to five-membered cyclic carbonates. The chart below illustrates the catalytic carbonation of a diepoxide, Ra being a divalent or spacer group (molecular or macromolecular, alkyl, cycloalkyl, aromatic, linear or branched, optionally polyfunctional chain and which may contain heteroatoms):

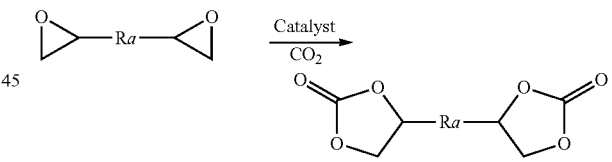

The reaction of the carbon dioxide with oxetane (1,3-epoxypropane, 4-membered cyclic ether) allows the formation of 6-membered cyclic carbonates. This synthetic pathway is described in Baba, A., Kashiwagi, H. Matsuda, H., Tetrahedron Letters 1985, 26, 1323-1324.

The insertion reaction of carbon dioxide into a cyclic ether is generally carried out under hard conditions, in high temperature and under high pressure in the presence of a catalyst and a solvent such as N-methylpyrrolidone. This reaction is disclosed in particular in Nomura, R., Ninagawa, A., Matsuda, H., J. Org. Chem. 1980, 45(19): 3735-3738 and Calo, V., Nacci, A., Monopoli, A., Fanizzi, A., Org. Lett. 2002, 4, 2561-2563.

The catalysts currently used to attach a carbon dioxide molecule onto a cyclic ether, generally an epoxidized compound, are in some cases non-polluting, readily recoverable and recyclable. These include Lewis acid complexes, organometallic compounds, transition metal complexes, polymers supported on a metal, amines, phosphines or phosphonium salts (($C_6F_{13}C_2H_4$)$_3$MePI, ($C_6F_{13}C_2H_4$)$_3$MePI, PBu$_4$I), ammonium salts such as tetrabutylammonium iodide or bromide (NBu$_4$I, NBu$_4$Br) alone or in admixture with SnCl$_4$.5H$_2$O or CaCl$_2$, alkali halide salts such as LiBr or KI with or without the presence of a complexing agent such as crown ether, amino acid, methyl iodide-quaternized chitosan or lecithin (cf. Green Chem., 2014, 16, 1987-1998; Catalysis Communications 2014, 44, 6-9; Catalysis Today 183 (2012) 130-135; Catal. Sci. Technol., 2012, 2, 1674-1680), the NaI/PPh$_3$ system, magnesium oxides, hydrotalcites, phthalocyaninato aluminum. An antimony-based catalyst, the tetraphenylstibonium iodide, is known to catalyze the oxetane carbonation.

Only a few catalysts are biosourced such as amino acid- or quaternized chitosan-based catalysts, or those based on soya lecithin, associated with an iodide ion or alkali iodide. Lecithin-based (Catalysis Today 183 (2012) 130-135) or quaternized chitosan-based (Catal. Sci. Technol., 2012, 2, 1674-1680) catalysts are extremely interesting but have nevertheless some shortcomings. The first has to be used in a substantial amount, requires the use of a quite high carbon dioxide pressure (20 bars) and temperature (100° C.). The second requires high reaction temperatures (120° C.) and long reaction times to expect complete reaction (>10 h), the yields being limited to 80-90% after 6 hours of reaction due to incomplete conversion of the reagents. Furthermore, this quaternized chitosan-based catalyst is not totally recyclable, because it is experiencing a significant loss of activity after each recycling cycle.

To overcome these drawbacks, it is necessary to develop a new cyclic ether carbonation catalyst which is effective, robust, biosourced, non-polluting and recyclable, so as to minimize the chemical risk, in order to form polyhydroxyurethane-precursor cyclocarbonates or polycyclocarbonates in high yields. This new catalyst should ideally enable faster carbonation reactions, complete conversions, at lower temperatures and pressures than the known catalysts allow, and its recyclability must not be accompanied by an activity loss.

The aim is also to prepare polyhydroxyurethane binder compositions by using as far as possible non-polluting and/or renewable raw materials. This non-bituminous binder should have rheological properties similar to those of a bituminous binder or a binder of petrochemical origin to which therefore it could be easily substituted in road or para road applications or applications related to civil engineering. For environmental reasons, this binder should have low ecotoxicity. The viscosity of the binder must decrease as the temperature increases, which enables easy handling at a moderate temperature, and it must recover its mechanical properties at the temperatures of use.

The above objects are achieved according to the invention by a biosourced polymer obtained by functionalization of chitosan so that it comprises monomer units of formulas A and B:

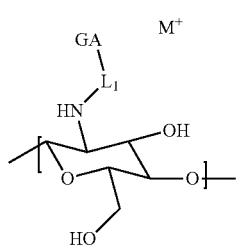

A

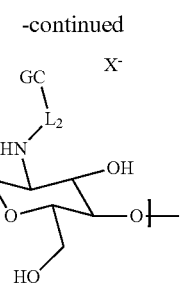

B wherein M$^+$ is a cation, X$^-$ is an anion, L$_1$ and L$_2$ are, independently of one another, a divalent group, GA is an anionic group, and GC is a cationic group. This biosourced catalyst can be seen as an MX salt complexed with a chitosan functionalized with anionic groups and cationic groups.

In the present application, the term "biosourced" refers to materials or compounds from biomass of vegetable or animal origin. These raw materials have the advantage of being renewable.

The invention also relates to a binder composition which can be used in particular for making road construction and/or civil engineering layers and/or coatings, marking products or sealants or insulating products, comprising a polymer binder of polyhydroxyurethane nature, derived from the reaction of at least one polyamine with at least one polycyclocarbonate, the polycyclocarbonate having been obtained by carbonation of a poly(cyclic ether) with carbon dioxide catalyzed by the biosourced polymer as defined above.

The invention also relates to a method for preparing a cyclocarbonate, preferably a polycyclocarbonate, by carbonation reaction of a cyclic ether, preferably a poly(cyclic ether), with carbon dioxide catalyzed by the biosourced polymer as defined above.

The invention further relates to a method for preparing the polymer binder of polyhydroxyurethane nature as defined above, comprising the following steps:
  providing a poly(cyclic ether),
  subjecting said poly(cyclic ether) to a carbonation reaction with carbon dioxide catalyzed by the biosourced polymer obtained by functionalization of chitosan as defined above, and recovering a polycyclocarbonate,
  subjecting said polycyclocarbonate to a polycondensation reaction in the presence of at least one polyamine to obtain the polymer binder of polyhydroxyurethane nature.

The binder used in the binder composition according to the invention is prepared in two main synthesis steps. In a first step, a poly(cyclic ether) is converted by the catalyst according to the invention into a polycyclocarbonate monomer, precursor of the polyhydroxyurethane binder.

In the present application, poly(cyclic ether) refers to a compound comprising a plurality of cyclic ether functions, including oxirane and/or oxetane functions. It is a molecular or macromolecular, alkyl, cycloalkyl, aromatic, linear or branched compound, optionally containing heteroatoms.

Cyclic ethers, for example cyclic monoethers or poly (cyclic ethers) are commercially available synthons or synthons which can be obtained by methods well known to those skilled in the art. These compounds are preferably epoxides, for example monoepoxides or poly(epoxides), more preferably diepoxides. 4-membered cyclic ethers or poly(4 membered cyclic ethers) may also be used. In the present application, poly(epoxide) refers to a compound comprising a plurality of epoxide functions (oxirane).

Epoxides/poly(epoxides) can be obtained by reacting epichlorohydrin with alcohols/polyols, generally diols, thereby providing access to diepoxides.

Diepoxides can also be obtained by acylation of glycidol with benzoyl bischloride to form a glycidyl bisbenzoate. This method can be adapted without difficulty to the production of poly(cyclic ethers).

Biosourced epoxides or poly(epoxides) can be obtained by epoxidation of triglycerides containing unsaturated fatty chains. Epoxidized triglycerides include in particular epoxidized soybean oil (denoted ESBO).

Epoxides or poly(epoxides) can also be obtained by enzymatic epoxidation of alkene double bonds, more particularly of terminal double bonds, with the aid of lipases and hydrogen peroxide.

Cyclic ethers, including poly(cyclic ethers), then undergo a catalytic carbonation reaction in the presence of carbon dioxide and the catalyst of the invention. The carbon dioxide may be used in various forms, including gaseous or supercritical form.

For example, the epoxidized soybean oil (ESBO) mentioned above leads after carbonation to carbonated soybean oil (denoted CSBO), precursor of a biosourced polyhydroxyurethane.

The inventors have developed a new carbonation catalyst which is derived from the functionalization of chitosan. Chitosan is a biopolymer derived from chitin which is enclosed by the shell of shellfish (crabs, shrimp), by the wall of some fungi and which is also present in the shell of certain insects.

The catalytic system according to the invention based on modified chitosan associated with the salt MX has many advantages. It allows the preparation of cyclocarbonates in a very effective way, especially polycyclocarbonate monomers, precursors of polyhydroxyurethane and demonstrated great versatility towards many substrates. Its catalytic performance is exceptional and has no equivalent. In addition to being robust, recyclable, biosourced, it is prepared from a raw material which has the advantage of being naturally occurring (it is derived from marine waste to more than 95%), non-toxic, biodegradable, inexpensive, and available in large quantities. In this sense, the catalyst of the invention complies with the principles of green chemistry, as producing cyclocarbonates using carbon dioxide as a raw material. Compared to known carbonation catalysts, it enables operation at lower temperatures and pressures while leading to complete reactions, and its recyclability is not accompanied by any loss of activity.

The preparation of the catalyst according to the invention from chitosan will now be described. Chitosan is a polysaccharide composed of the random distribution of D-glucosamine linked by β-(1-4) (deacetylated unit) and N-acetyl-D-glucosamine (acetylated unit). It can be schematically shown as follows:

It is characterized by varying degrees of acetylation, typically below 50%. The degree of acetylation (noted DA) is the percentage of acetylated units in relation to the number of total units of the chain.

The carbonation catalyst used in the present application is obtained from the chemical functionalization of the nitrogen atom of some D-glucosamine units of chitosan in two different ways, preferably all of these units. It is obtained by functionalization of chitosan so that it includes the following two types of monomer units of the formulas A and B:

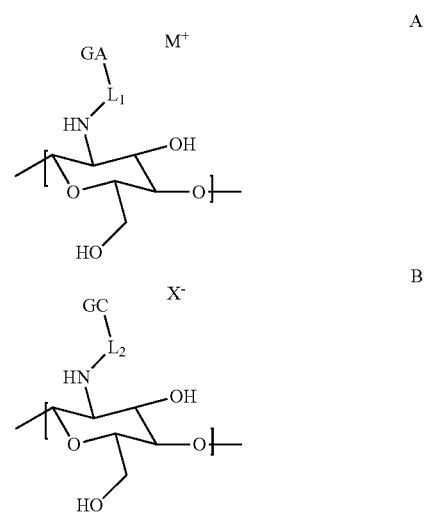

wherein $M^+$ is a cation, $X^-$ is an anion, $L^1$ and $L^2$ are independently of one another, a divalent group, GA is an anionic group, and GC is a cationic group.

This double functionalization of chitosan leads to a zwitterionic structure. Without being bound by theory, the inventors believe that the modified chitosan plays a supporting role and that its structure exacerbates the MX salt activity by promoting the dissociation of the salt and thereby reducing the interaction between cation $M^+$ and anion $X^-$.

Chitosan may previously have undergone a depolymerization reaction in order to reduce its polymerization degree.

The catalytic system according to the invention is usually formed in situ in the reaction medium, by mixing the salt MX and a modified chitosan, the precursor of the effective catalyst, the precursor differing from the effective catalyst in that the GA group and/or the GC group is (are) in the form of a neutral precursor group (e.g. GA is in protonated form) and/or in that one and/or the other counterions associated with the GA and/or GC group (is) are different from $M^+$ and/or X. The precursor of the modified chitosan according to the invention may for example be a salt such as a

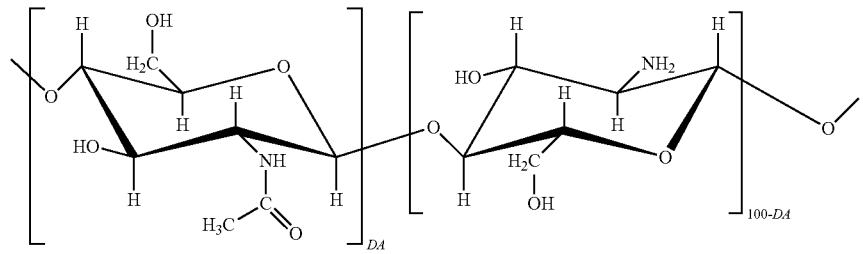

hydrochloride, which must then be neutralized with a base and associated with the desired salt of formula MX. The catalytic system according to the invention can also be prepared so as to be fed directly in its final form in the reaction medium.

The anionic groups GA may be selected, without limitation, from carboxylate, sulfonate, sulfate, sulfite, phosphate, phosphonate, sulfinate, phenate and thiolate groups, preferably from carboxylate, sulfonate, phosphonate and phosphate groups. The preferred group is the carboxylate group $CO_2^-$.

The preferred monomer units of formula A are monomer units of formula A1, wherein $M^+$ and GA have the meaning given previously (GA preferably denotes the carboxylate group) and n is a natural number, preferably ranging from 1 to 10, preferably from 2 to 5, and ideally equal to 2:

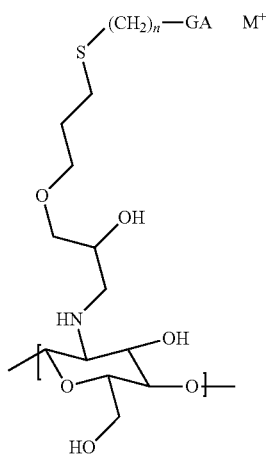

A1

The preferred monomer units of formula A1 are monomer units of formula A2, wherein $M^+$ has the meaning given previously:

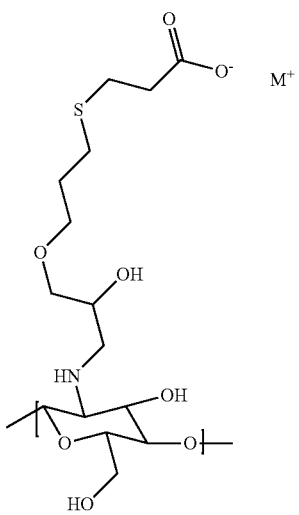

A2

The cationic groups GC may be selected, without limitation, from quaternary ammonium, sulfonium, iodonium, and phosphonium groups, preferably quaternary ammonium.

The monomer unit B may especially comprise a tetraalkylammonium, alkylamidoalkyltrialkylammonium, trialkylbenzylammonium, trialkylhydroxyalkyl-ammonium or alkylpyridinium group, preferably tetraalkylammonium.

The quaternary ammonium group is preferably a group of the following formula, shown here related to divalent/spacer group $L_2$:

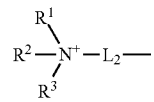

wherein $R^1$, $R^2$ and $R^3$ are independently aryl groups, aralkyl groups or linear or branched alkyl groups, preferably linear, preferably having from 1 to 20 carbon atoms, more preferably from 1 to 10 carbon atoms, and even more preferably from 1 to 4 carbon atoms. $R^1$, $R^2$ and $R^3$ are preferably independently alkyl groups such as methyl, ethyl, propyl or butyl groups, ideally methyl groups.

The divalent groups $L_1$ and $L_2$, which are spacer groups, denote preferably alkylene, arylene groups or a combination thereof, optionally containing one or more heteroatoms or functional groups, and preferably containing 2 to 16 carbon atoms, more preferably 3 to 8 carbon atoms.

The preferred monomer units of formula B are monomer units of formulas B1 and B2, where GC and $X^-$ have the meaning given previously, and m denotes a natural number, preferably ranging from 1 to 10, preferably from 1 to 5, and ideally equal to 1:

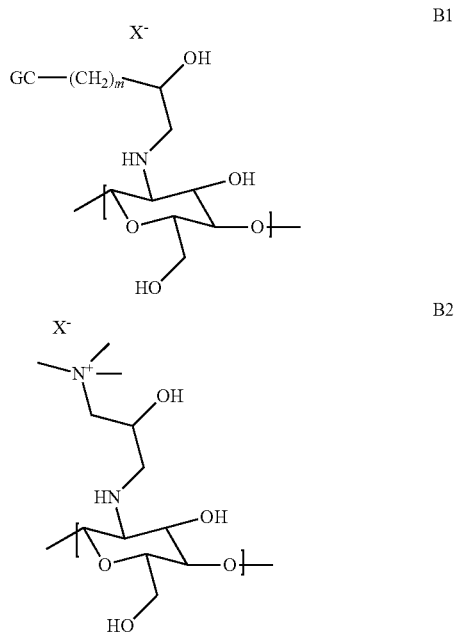

The monomer units of formulas A, A1, A2, B, B1 and B2 may be synthesized by functionalization of chitosan involving chemical reactions well known to those skilled in the art. A1 and A2 monomer units may for example be prepared by reacting chitosan with a suitable epoxide carrying a terminal double bond, followed by a well known thiol-ene coupling reaction with an appropriate mercaptan, whereas the monomer units B1 and B2 may for example be prepared in a single step of reaction of chitosan with a suitable epoxide.

The catalyst of the invention preferably comprises monomer units of formulas A1 and B1, more preferably monomer units of formulas A2 and B2 and then constitutes a chitosan simultaneously functionalized by ammonium and carboxylate groups (which can be obtained from their precursor carboxylic acid).

The catalyst according to the invention therefore includes a chitosan backbone and comprises monomer units A, monomer units B, optionally D-glucosamine units (cases where the functionalization did not involve all the D-glucosamine units), and optionally N-acetyl-D-glucosamine units if the degree of acetylation is not zero. Other monomer units than those just mentioned may optionally be present in the catalyst according to the invention. In particular, some amino groups of chitosan may be functionalized with other reagents than those leading to the monomer units A and B, for example with carboxylic acids or diacids. We can also mention monomer units in which the amino group of chitosan has undergone functionalization by N-carboxyalkylation, including N-carboxymethylation or N-carboxybutylation. The introduction of these various chemical functions on chitosan is known to those skilled in the art.

The monomer units of formulas A and B are preferably randomly distributed in the structure of the biosourced polymer according to the invention, but may also be present as blocks.

In the monomer units A, $M^+$ is a cation, preferably an alkali metal cation such as $Na^+$, $K^+$, $Li^+$, preferably $K^+$. In the monomer units B, $X^-$ is an anion, such as, without limitation, a halide anion or a hydroxide, triflate, hydrogenosulfonate, sulfate, carbonate, hydrogenocarbonate, nitrate, or chlorate ion, a carboxylic acid anion such as acetate ion, preferably a halide anion such as $Cl^-$, $F^-$, $Br^-$, $I^-$, more preferably the anion $I^-$. The couple $M^+/X^-$ is preferably provided in the reaction medium as the salt MX. This couple preferably denotes $K^+/I^-$, $K^+/Cl^-$, or $K^+/Br^-$, ideally $K^+/I^-$, which has a better catalytic activity than the other salts.

The monomer units A are present in the structure of the catalyst according to the invention in amounts generally ranging from 50 to 80%, relative to the total number of monomer units, preferably from 60 to 80% and more preferably from 65 to 75%.

The monomer units B are present in the structure of the catalyst according to the invention in amounts generally ranging from 20 to 50%, relative to the total number of monomer units, preferably from 20 to 40% and more preferably from 25 to 35%.

D-glucosamine monomer units are present in the structure of the catalyst according to the invention in amounts generally ranging from 0 to 10% relative to the total number of monomer units, preferably from 0 to 5% and more preferably from 0 to 2%. Ideally, the catalyst according to the invention does not comprise any D-glucosamine monomer units.

D-glucosamine monomer units are present in the structure of the catalyst according to the invention in amounts generally ranging from 0 to 10% relative to the total number of monomer units, preferably from 0 to 5% and more preferably from 0 to 2%.

The degree or rate of acetylation (DA) of the catalyst according to the invention is preferably less than 50%, still preferably less than 25%, more preferably less than or equal to 20%, most preferably less than or equal to 15%, ideally less than or equal to 10%.

The number of monomer units of formula A/number of monomer units of formula B ratio present in the structure of the catalyst according to the invention preferably ranges from 50/50 to 80/20, more preferably from 60/40 to 80/20 and most preferably from 65/35 to 75/25.

The catalyst according to the invention, when it comprises non-functionalized amino groups, can be used in neutral form ($NH_2$) or in salt form ($NH_3^+$), especially in the form of acetate, lactate, glutamate, gluconate or pyrrolidone carboxylate salt.

Its rate of hydration is preferably less than or equal to 30% by weight, more preferably less than or equal to 15% by weight. Its molecular weight generally ranges from 150,000 to 500,000 g/mol, preferably 300,000 to 400,000 g/mol. Its polymerization degree preferably ranges from 200 to 2000, preferably from 500 to 1500, more preferably from 700 to 1100. Such polymerization degrees can be obtained by having subjected chitosan to a depolymerization reaction, for example via microwave activation.

The catalyst according to the invention is preferably used in a molar amount ranging from 0.01% to 10%, still preferably 0.01% to 5%, more preferably 0.1% to 2% and even more preferably 0.1% to 1%, ideally 0.2 to 0.8%, relative to the precursor cyclic ether compound content.

The catalyst according to the invention has an outstanding catalytic activity, so that carbonation reactions can be performed quantitatively or quasi-quantitatively (yield ≥95%) at moderate temperatures, much lower than those permitted by known catalysts, under lower carbon dioxide pressures, and faster than known catalysts. The catalyst according to the invention generally provides TONs ("turnover number", which represents the number of mol of substrate that 1 mol of catalyst can convert) above 500 and TOFs ("turnover frequency", which is the TON per time unit) higher than 125 $h^{-1}$.

The carbonation reaction according to the invention is preferably carried out in the absence of solvent. It is preferably conducted at a temperature less than or equal to 100° C., preferably less than or equal to 90° C. and more preferably less than or equal to 80° C. The reaction temperature is preferably higher than or equal to 50° C., more preferably higher than or equal to 60° C. and most preferably higher than or equal to 70° C. It is preferably carried out under a carbon dioxide pressure of less than 10 bar, preferably less than 8 bar. Said pressure is preferably higher than 2 bar, more preferably higher than 4 bar, a pressure increase generally accelerating the carbonation reaction according to the invention. The carbonation reaction according to the invention requires reaction times of preferably less than 4 hours, more preferably less than 3 hours, and most preferably less than or equal to 2 hours.

Typical reaction conditions for a carbonation reaction catalyzed by the catalyst according to the invention to obtain yields greater than 95% are 80° C., 7 bar, 2 hours of reaction. For comparison, other carbonation catalysts (or catalytic systems) such as $NBu_4Br/SiO_2$, $NBu_4Br$, $NBu_4I$, $(C_6F_{13}C_2H_4)_3MePI$, $(C_6F_{13}C_2H_4)_3MePI$, $PBu_4I$, or lecithin/KI lead to reactions with lower yields requiring temperatures of up to 150° C., carbon dioxide pressures of up to 140 bar, for reaction times of up to 24 hours. The present catalyst makes it possible to divide the reaction time by a factor ranging generally from 2 to 12, and the carbon dioxide pressure by a factor ranging generally from 3 to 20, with respect to known catalysts. This is important from a security point of view.

The catalyst according to the invention is also completely reusable since it demonstrated unchanged activity in different reactions even after 6 reaction cycles, which is absolutely not the case of carbonation catalysts known hitherto.

Finally, the catalyst according to the invention is extremely robust since it is resistant to heat treatment at 150° C. for 48 hours without any weight or activity loss.

In a second synthetic step, the polycyclocarbonate is converted into polyhydroxyurethane by reaction with at least one polyamine. Preferably, the polyhydroxyurethane is formed without using isocyanate reagents.

The stoichiometric polyaddition of polycyclocarbonates on polyamines is generally carried out in polar solvent medium (DMSO, dimethylacetamide, DMF . . . ) at temperatures ranging from 20° C. to 100° C. for an average duration of 24 to 48 hours, optionally under inert atmosphere. The reagent concentrations are generally from 0.5 to 1 mole/liter in the synthesis solvent. The molar ratio of polyamine/polycyclocarbonate generally ranges from 0.8 to 1.2. Purification is usually accomplished by precipitation of the polymer in ethyl ether, washing with ethyl ether and then vacuum drying. Yields are very high, often above 90%. These reactions are described in more detail in Tomita, H., Sanda, F., Endo, T., J. Polymer Sci., Part A 2001, 39, 162-168 or in Steblyanko, A., Choi, W., Sanda, F., J. Polymer Sci., Part A 2000, 38, 2375-2380.

When the cyclocarbonate is asymmetrical, which is the case when it is 5-membered ring, two opening modes of the cyclic carbonate are possible, leading to the possible formation of three units with primary and/or secondary alcohol functions, in the case of reacting a diamine with a dicyclocarbonate. One of the units that can be obtained during the reaction of a primary diamine with a 5-membered dicyclocarbonate is shown below:

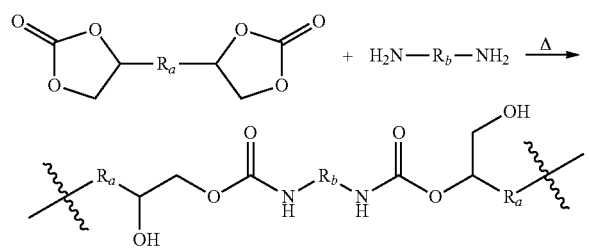

The cyclocarbonate groups of the polycyclocarbonate preferably are a 5 or 6-membered ring. The 6-membered cyclic carbonates are generally more reactive than the 5-membered cyclic carbonates, which allows a faster polymerization and to obtain higher molecular weight polyhydroxyurethanes. Preferably, the polycyclocarbonate is a dicyclocarbonate, that is to say it comprises two cyclic carbonate groups.

By polyamine, it is meant a chemical compound having at least two amine groups, preferably from 2 to 6 amine groups. The polyamine may be a primary or secondary polyamine, or a compound comprising both the primary or secondary amine functions. The polyamine preferably comprises amino groups $NH_2$ (primary polyamine) or primary amino groups (secondary polyamine), more preferably amino groups. The polyamine may be aliphatic or aromatic, including heterocyclic. The polyamine is preferably a diamine, and is preferably reacted with a dicyclocarbonate. Useful polyamines include phenylene diamines such as para-phenylene diamine and aliphatic diamines, in particular of $H_2N-(CH_2)_n-NH_2$ type, n ranging from 2 to 10, especially ethylene diamine, 1,4-butylene diamine, hexamethylene diamine and 1,10-diaminodecane. The polyamines may be used in free form or in salt form, for example hydrochloride.

The reaction of polycyclocarbonates with the polyamines can be conducted in the presence of catalysts, in particular a strong base such as potassium t-butoxide. It can also be carried out in the presence of at least one polyfunctional optional compound of natural or synthetic origin, able to participate in polycondensation reactions, such as, without being restricted to these compounds, a polyol, a polythiol, an aminothiol, or an aminoalcohol. The molar ratio of all of these optional compounds relative to all of the polyamines is preferably less than 1, more preferably less than 0.1.

By aminoalcohol, it is meant a chemical compound having at least one hydroxyl group and at least one amino moiety, and preferably containing from 2 to 6 reactive functions. The amine group(s) of the aminoalcohol is (are) preferably amino groups ($NH_2$) or primary amine groups, more preferably amino groups. The aminoalcohol is preferably bifunctional (that is to say it comprises a hydroxyl group and an amino group) or trifunctional. The aminoalcohol may be aliphatic or aromatic, or heterocyclic, preferably aliphatic. It can be used in free form or in the form of salt, for example of hydrochloride.

Non-limiting examples of aminoalcohols are the following compounds: 2-aminoethanol, 2-aminopropanol, 2-aminobutanol, 2-aminohexanol, 2-methyl-2-aminoethanol, 2-methyl-2-aminoethanol, 2-methyl-2-aminopropanol, 2-ethyl-2-aminoethanol, 2-ethyl-2-aminopropanol, 1-amino-2-propanol, 1-amino-2-butanol, 1-amino-2-pentanol, 3-amino-2-butanol, 2-amino-1,3-propanediol, 2-amino-2-ethyl-1,3-propanediol, 3-amino-1,2-propanediol, tris-(hydroxymethyl)-aminomethane, triisopropanolamine, 2-dimethylamino-2-methyl-1-propanol and aminophenols.

By aminothiol, it is meant a compound having at least one amine group and at least one thiol group. Non-limiting examples of aminothiols are cysteine and aminothiophenols such as 2-aminothiophenol.

By polyol, it is meant a chemical compound having at least two hydroxyl groups, preferably 2 to 6 hydroxyl groups. The polyol is preferably a diol or triol. It is preferably an aliphatic polyol.

Preferred polyols according to the invention are derived from renewable resources. However, polyols of petrochemical origin can also be used. Mention may be made, without being restricted to these compounds, of glycerol, polyglycerols (e.g., di-, tri-, tetra- and penta-glycerol), sorbitol, 1,3-propanediol, 1,2-propanediol, 1,4-butanediol, 1,6-hexanediol, ethylene glycol, diethylene glycol, dipropylene glycol, triethylene glycol, polyethylene glycols of weight average molecular weight ranging preferably from 300 to 6000 g/mol, oligosaccharides, isosorbide, dipentaerythritol, pentaerythritol, trimethylol propane.

By polythiol, it is meant a chemical compound incorporating in its structure at least two thiol groups, preferably from 2 to 6 thiol groups, such as the di, tri, tetra, penta or hexathiol compounds. Examples of polythiols useful in the present invention are given in the application WO 2006/103371.

Generally, the different compounds which may be involved in the synthesis of polyhydroxyurethanes according to the invention, including cyclocarbonates, polycyclocarbonates, cyclic ethers, poly(cyclic ethers), polyamines, polyols and/or aminoalcohols, can be derived from renewable resources or resources of fossil origin, but are preferably of renewable origin (naturally occurring). "Naturally occurring" compound refers to, in the sense of the invention, any compound from nature, insofar as it is extracted from the renewable terrestrial and marine biomass or living organisms (animals, microorganisms), possibly later modified for example chemically, or obtained through the action of living microorganisms (e.g. enzymes or bacteria) on a naturally occurring compound according to biofermentation or biosynthesis type processes. The compounds derived from petroleum, of fossil origin, do not fall into this category.

The polyhydroxyurethane polymers obtained are stable over a wide range of temperature, and generally degrade only at temperatures in excess of 200-220° C., which makes them quite suitable for use as a binder according to the invention. Their behavior is comparable to that of conventional polyurethanes obtained from isocyanates. They preferably have a glass transition temperature of from −60° C. to 120° C., preferably from −50° C. to 0° C., which can be determined by differential scanning calorimetry, and modulated by varying the chain length of polyamine or polycyclocarbonate monomers.

The number average molecular weight Mn of the binder polyhydroxyurethane according to the invention preferably ranges from 5,000 to 60,000 g/mol, more preferably from 5,000 to 30,000 g/mol, most preferably from 7,000-20,000 g/mol.

The polymeric binder according to the invention has a viscosity at 25° C. ranging from 0.5 Pa·s to $10^6$ Pa·s, preferably from $10^2$ Pa·s to $10^6$ Pa·s, more preferably from $10^3$ Pa·s to $10^6$ Pa·s, more preferably from $10^4$ Pa·s to $10^6$ Pa·s, and most preferably from $10^5$ Pa·s to $10^6$ Pa·s. The viscosity can be adjusted in particular by adapting the nature of the reagents (whether or not using oligomerized reagents, functionality and monomer length . . . ). Its melting point (to drop fall) ranges preferably from −50° C. to 200° C., more preferably from 50 to 140° C., its penetrability at 25° C. measured according to NF EN 1426 standard is preferably greater than 5 1/10 mm at 25° C., its acid value measured according to NF T 60-204 standard is preferably less than 150 mg KOH/g, its iodine value measured according to ISO 3961 standard is preferably less than 150 g $I_2$/100 g, its amine value is preferably less than 50 mg KOH/g and its hydroxyl value measured according to NF T 60-213 standard is preferably less than 150 mg KOH/g.

The polyhydroxyurethane binder represents preferably from 2 to 100% of the weight of the binder composition according to the invention, more preferably from 2 to 98% by weight, more preferably from 5 to 75%, most preferably from 10 to 60%, or from 20 to 40% by weight, based on the total weight of the composition. The polyhydroxyurethane binder represents preferably at least 2% of the weight of the binder composition, preferably at least one of the following values: 5%, 10%, 20%, 25%, 30%, 40%, 50%, of the weight of the binder composition.

The binder composition according to the invention is preferably non-bituminous, which means that it preferably contains less than 1% by weight of bitumen, and preferably 0%, based on the total weight of the composition.

The binder composition according to the invention may further contain at least one resin, preferably a naturally occurring resin, in particular of vegetable origin, such as resins secreted by certain plant and their modified derivatives.

The binder composition according to the invention may comprise up to 98% (0-98%, preferably 2-98%) by weight of said resin, based on the total weight of the binder composition, preferably from 25 to 95% by weight, more preferably 40 to 90% by weight and most preferably 40 to 70% by weight, the resin(s) preferably representing at least 2% of the weight of the binder composition, more preferably at least one of the following values: 10%, 25%, 30%, 40%, 50%, of the binder composition weight.

Said naturally occurring resin can be used as such or in modified form, that is to say after having undergone at least one chemical transformation such as esterification, hydrogenation, reaction with maleic anhydride (so-called maleization), polymerization or dismutation, this list being obviously not exhaustive.

Said naturally occurring resin is preferably derived from renewable resources, typically plant. It is then so-called "from harvest". The naturally occurring harvest resins include accroid resins, dammar, rosin resins (which contain predominantly rosin acids), optionally modified, including rosin esters (in particular esters formed with polyols) and rosin amides, soaps of rosins, metal resinates, dimers of rosin acids such as abietic acid and derivatives of these resins.

Natural rosin resins (unmodified) include pine gum rosins, wood rosins and tall oil rosins, such as tall oil pitch. Modified natural rosins include hydrogenated, dismutated, polymerized and maleized rosins. Rosin esters include esters of glycerol and natural, hydrogenated, dismutated, polymerized and maleized rosins, and esters of pentaerythritol and natural and hydrogenated rosins. Metal resinates include metal salts of rosin acids, for example of Ca (calcium resinates), Zn (zinc resinates), Mg, Ba, Pb, Co, obtained from natural or modified rosins, and mixed resinates of calcium and zinc.

In addition, although this is not recommended for the reasons mentioned previously, resins derived from fossil resources may also be used for the formulation of the binder composition according to the invention. These fossil resins include copal resins.

To be usefully included in the formulation of the binder composition according to the invention, said resin, naturally occurring or of fossil origin, preferably has a softening temperature, measured according to NF EN 1427 standard, of from 30° C. to 200° C., more preferably from 80° C. to 200° C., most preferably from 100° C. to 200° C., and ideally from 120° C. to 180° C. In general, resins having a softening temperature of at least 100° C., preferably at least 120° C., are preferably used because these resins lead, after mixing with the modified naturally occurring oils and/or fats of the invention in suitable proportions, to binders having viscoelasticity characteristics which are very close or similar to those of the bitumen in a temperature range of from −20° C. to +70° C., and without the need of adding to the formulation of the binder composition an elastomer and/or a thermoplastic polymer.

The table below summarizes the preferred families of resins useful for the present invention.

| Name | Type (1) | Softening temperature |
| --- | --- | --- |
| Congo copal | F | 100 to 180° C. |
| Zanzibar copal | F | 140 to 190° C. |
| Benguela Copal | F | 104 to 130° C. |
| Accroids | H | 100 to 133° C. |
| Dammar | H | 75 to 126° C. |
| Modified rosins | H, T | 125 to 160° C. |
| Rosin esters (esterification in the presence of glycol) | H, T | >120° C. |
| Rosin esters (maleinisation in the presence of maleic anhydride) | H, T | >130° C. |
| Calcium resinate | H, T | 135 to 170° C. |

(1) F: Fossil, H: Harvest, T: having undergone a chemical transformation.

Of course, mixtures of two or more of the aforementioned resins may be used. For further information on the naturally occurring resins, one can refer to the article by Bernard DELMOND, "Résines naturelles", Techniques de l'Ingénieur, traité "Constantes physico-chimiques"-K340-1 to 12, May 2002.

The binder composition according to the invention may be essentially or exclusively (100%) naturally occurring. According to the invention, by "essentially naturally occurring", it is meant a binder which comprises at least 80%, preferably at least 90% by weight of naturally occurring compounds.

According to one embodiment, the binder composition according to the invention is free of any natural or synthetic elastomer, such as for example polybutadiene, latex, styrene-butadiene rubber (SBR), styrene-butadiene-styrene (SBS), ethylene-vinyl acetate (EVA). According to another embodiment, the binder composition according to the invention is free of any thermoplastic polymer such as, for example, polyolefins (polyethylene, polypropylene, copolymers of vinyl acetate and ethylene and/or acrylic compounds), polyamides, polyesters other than the modified oils or fats according to the invention, polyphenylene oxide, polyacetals, polycarbonates, polysulfides, polyether ether ketone, poly(meth)acrylates. The binder composition according to the invention can also be simultaneously free of any natural or synthetic elastomer and any thermoplastic polymer.

The natural and synthetic elastomers and thermoplastic polymers, which can be selected from those mentioned above, are preferably less than 10% of the total weight of the binder composition of the invention, preferably less than 5%.

The binder composition according to the invention may also comprise one or more coloring agents such as inorganic pigments and organic dyestuffs, or one or more curing agents.

The binder composition according to the invention, very versatile, may advantageously replace bituminous binders or petrochemical-based synthetic binders in all of their applications without any technical difficulty. The formulation of the binder composition according to the invention is adjusted depending on the characteristics of the bitumen/binder that it replaces. It can be used for producing materials for building and/or public works, and in particular materials for making road construction and/or civil engineering layers and/or coatings. Thus, the binder composition according to the invention may be used to bind aggregates together and optionally to stick them on the support on which they are spread or promote their adhesion.

The term aggregate refers to a granular material used in the construction including a material described in the standard XP P 18-545. The aggregates, within the meaning of XP P 98-135, may also be used in combination with the binder composition according to the invention. Aggregates include fines, fillers (expense), sand, grit and gravel.

The binder composition can be mixed with the aggregates before application to form hot or cold mixes (coating technology), or spread on the pavement before or after spreading the aggregates to form layers or coatings. To characterize the asphalt mixes, the description of their granular formulation, that is to say the distribution of the mass of the aggregates which are part of the mix depending on the granular fraction, is especially used.

The invention further relates to a material for producing road construction and/or civil engineering layers and/or coatings, comprising a binder composition according to the invention and optionally an aggregate.

When the material of the invention does not include aggregate, it can be used for making fluxed bitumen or emulsion bond coats.

When the material of the invention comprises an aggregate, for example for manufacturing mixes, it comprises preferably from 85 to 97% by weight of aggregate, based on the total weight of the material. In this embodiment, said material comprises preferably from 3 to 15% by weight of binder composition according to the invention, based on the total weight of the material, that is to say an amount corresponding to that of bitumen conventionally used for the same application.

The aggregates generally comprise fine aggregates of particle size ranging from 0 to 63 μm (fines and/or fillers) and coarse aggregates selected from sand, grit and/or gravel. The particle size of the coarse aggregates can be up to 80 mm.

The material of the invention may especially be a mix, for example cold microasphalt surfacing or fluxed anhydrous binder mix, hot mix, surface dressing, mastic asphalt or road marking material.

The material layers or coatings according to the invention are formed in situ, i.e. the layer or coating is formed directly on the support to be coated. For example, in the case of road surfaces, the support will be the pavement. A mixture of binder composition as defined above and of aggregates can be applied or a spreading on the support of said binder composition can be made before or after spreading the aggregates. The layers or coatings thus formed may be continuous. The layers or coatings are preferably used outdoor.

Regarding the asphalt mixes, developments in technology allowed for the selection of granular formulas more suited than others in meeting performance specifications. By performance it is meant the properties of the mixes as characterized using the following tests:

| Performance | Testing standards | Comments |
| --- | --- | --- |
| Compactability | NF EN 12697-31 | Ability of the mix to be placed with a specified compactness |
| Mechanical strength and water resistance | NF EN 12697-12 | Durability against traffic aggressions and stripping risks |
| Rutting resistance | NF EN 12697-22 | Ability to withstand the creep related to traffic application |
| Complex module | NF EN 12697-26 | Ability to support efforts |
| Fatigue behavior | NF EN 12697-24 | Ability to keep the mix properties intact according to load application repeat |

Regarding the mixes made with the binder composition according to the invention, one can obviously retain proven granular formulations in the case of asphalt mixes. However, the characteristics of the binder composition according to the invention allow these granular formulations to be reviewed. That is why, in the case of binder applications according to the invention, any combination of granular fractions may be considered.

When the binder composition according to the invention is used in road applications, it can be characterized by the same parameters as bituminous binders, measured using the same methods, expressed in the same units. Specifications for paving grade bitumen and hard paving grade bitumen are given respectively in the standards NF EN 12591 and NF EN 13924. They are generally characterized by a penetrability at 25° C., measured according to NF EN 1426 standard and expressed in tenth millimeter, by a softening temperature, expressed in degree centigrade and measured according to NF EN 1427 standard, or by their viscosity. As with bitumen, the binder composition of the invention may have a penetrability at 25° C. ranging from 10 to 330 1/10 mm, preferably from 20 to 220 1/10 mm.

The binder composition according to the invention can be used, depending on the application, as such (neat), fluxed (that is to say modified by addition of a solvent) or in the form of an aqueous emulsion.

When fluxed, the binder composition of the invention comprises at least one fluxing agent (plasticizer), such as a solvent of petroleum, petrochemical or carbochemical origin, or preferably a naturally occurring fluxing agent, ideally animal and/or vegetable fat-based, renewable and non-toxic. These naturally occurring fluxing agents can advantageously be modified by oxidation in order to increase their drying properties, as disclosed in the application FR 2876382, in the name of the applicant.

In the case of emulsions, any conventional emulsifier used for the emulsification of bitumen, including cationic, anionic, amphoteric or nonionic emulsifier, or mixtures of these emulsifiers, which are well known to those skilled in the art, can be used. The binder composition according to the invention can be emulsified using conventional means used for the emulsification of bitumen, for example colloidal mill, static mixer or phase inversion processes in laminar regime. The formula of the binder emulsion according to the invention is chosen according to the intended application and replaces suitably the bitumen emulsions in their applications.

The binder composition of the invention can be emulsified in order to facilitate their use in processes or applications as varied as coating or spreading (in particular surface dressings, with emulsion or anhydrous binders), bond coats, cold microasphalt surfacings (cold mixes with emulsion), curing coats, impregnation, soil and gravel treatment, emulsion gravel, emulsion based mixes, generally the processes as described in the book "Les émulsions de bitume" edited by the Section des Fabricants des Emulsions Routières de Bitume (SFERB), protective layers of pipelines, metal structure or concrete structure, the manufacture of thermal and sound insulation panels based on wood particles or polymer materials, and generally the uses described in "The Shell Bitumen Industrial Handbook" published by Shell Bitumen in 1995, ISBN 0-9516625-1-1.

The binder composition according to the invention can also be used for the manufacture of sealants or insulating products, including membranes, geomembranes and sealing sheets. The membranes and geomembranes according to the invention include a textile impregnated with a binder of the invention and generally fillers, preferably of limestone filler type. These fillers represent preferably 10 to 30% relative to the total weight of the binder composition and fillers.

The geomembranes prepared according to the invention can be manufactured from a textile so-called geotextile impregnated with a binder according to the invention. The geotextile is woven or nonwoven, of a material preferably selected from polyethylene, polypropylene, polyamide, polyester or a mixture of these products. These geomembranes enable the sealing of the structure in which they are used, and are adapted to deal with environmental problems such as discharge confinement, polluted liquid and leachate storage, various waste storage including radioactive waste, protection of groundwater. They are also used in the construction of hydraulic structures such as dams, ponds and canals.

The sealing sheets prepared according to the invention may in particular be used for sealing flat roofs (inaccessible, self-protected or under grit, pedestrian, private, garden terrace roofs . . . ), sealing buried walls, covering buildings (residential or industrial).

In addition, the binder composition according to the invention can be used for the manufacture of mastic asphalt, which typically comprises a mixture of aggregates, including fillers, and binder according to the invention, and have a hot-fluid consistency.

The mastic asphalt according to the invention is typically a dense and porosity-free material further comprising the binder composition according to the invention, mineral fillers comprising fines/fillers of particle size less than 63 µm, sand of particle size ranging between 63 µm and 2 mm, and grit of particle size ranging between 2 mm and about 14 mm. The mineral filler composition is selected so as to minimize the voids in the stone skeleton, whereas the binder content depends on the volume of voids in the stone skeleton. The mastic asphalt comprises preferably, by weight, 5 to 30% of binder according to the invention, more preferably 5 to 15%, and 70 to 95% of mineral fillers (including fillers, sand and grit), more preferably 85 to 95%.

Mastic asphalt is manufactured by progressive mixing of the different mineral fillers in the binder composition brought to a liquid phase by increasing the temperature, and by continuous kneading of the mixture to maintain its homogeneity.

The homogeneous mixture is then hot-poured and solidifies by simple cooling. The resulting mastic asphalt coating is usable in that state, without additional compaction. The mechanical properties of the mastic asphalt coating depend on the percentages and the nature of the various components (mineral fillers and binder). Indeed, the balance between the amounts of binder and mineral fillers confers on mastic asphalt its three fundamental properties that are the ability to be hot-poured, sealing and wear resistance.

According to its mechanical properties, the mastic asphalt coating can be a particularly suitable coating for the following uses:
 traffic lanes for light and heavy vehicles (road surfaces, parking, ramps, and industrial floors for example),
 pedestrian lanes (city sidewalks, pedestrian walkways and terraces for example),
 protective or sealing layers for terraces or roofs of buildings or civil engineering work.

The binder composition according to the invention can also be used for the manufacture of marking products, especially in the road sector. Examples of such products are permanent or temporary, water-based or non-aqueous solvent-based paints, and thermoplastic or water-based coatings. These marking products preferably comprise, by weight, 10 to 50% of binder according to the invention, more preferably 30 to 40%, 1 to 40% of pigments, more preferably 5 to 25%, 20 to 60% of fillers, more preferably 35 to 45%, based on the total weight of the marking product. Modified, naturally occurring oils and fats according to the invention are preferably 5 to 20% of the weight of the marking product.

When the binder composition of the invention is used as a binder for marking product, it can be used in various forms, in particular in raw form (unprocessed), as an emulsion in aqueous phase or dissolved in the solvent phase. The marking product when used as an emulsion preferably comprises 30 to 70% by weight of dry extract.

The marking product may comprise, in addition to the solvents (fluxing agents) of the optionally used, modified, naturally occurring oil and/or fat, one or more additional solvents which are identical or not to the solvent of the modified, naturally occurring oil and/or fat, for example water. Preferably, the marking products in solvent phase contain solvents from renewable resources of vegetable or animal origin such as Vegeflux® of the Colas company and bioethanol.

The fillers of the marking product are used to adapt certain mechanical, chemical, electrical or rheological characteristics. Preferably used are fillers of mineral origin. The most frequently used fillers are sulphates, silicates, carbonates such as calcium carbonate ($CaCO_3$) and dolomite ($CaCO_3$, $MgCO_3$), oxides such as silica ($SiO_2$), amorphous or crystalline. Kelp or fibers can also be used as filler.

Marking products may further comprise one or more additives selected from coalescing agents, defoamers, rheological agents, surfactants and dispersants.

Preferably, the marking products are permanent or temporary, aqueous or non-aqueous solvent-based traffic paints, hot or cold coated materials, preformed bands. A road marking product of road paint type preferably includes also glass beads and/or anti-skid materials that can be incorporated in pre-mixes or by dusting.

The products prepared from the binder composition according to the invention can be used for producing materials for building and/or public works, and in particular materials for making road construction and/or civil engineering layers and/or coatings, including for the construction and repair of roads, highways, airfield runways, industrial, sports or pedestrian floors, development of roads and various networks, railway networks; materials for the development of road equipment such as signaling (marking products); materials for the construction of industrial buildings, especially for sealing and insulation of industrial buildings, protection and siding of civil engineering works and industrial buildings, noise barriers and all security arrangements as well as the production of all materials related to these fields.

The examples which follow illustrate the invention without limiting it. Unless otherwise indicated, parts and percentages are by weight.

EXAMPLES

I. Materials Used

Chitosan used is chitosan 652, derived from shrimp shells, provided by the France Chitine company (Marseille, France), having a degree of acetylation (DA) in the order of 10%, a molecular weight of about 150,000 g/mol and a hydration rate of 10% by weight (determined by thermogravimetric analysis). It is soluble in aqueous solutions of pH<6.

The allyl glycidyl ether (97%, Alfa Aesar), glycidyl trimethyl ammonium chloride (>90%, Aldrich), 4,4'-azobis (4-cyanovaleric acid) (>75%, Aldrich), 3-mercaptopropionic acid (>99%, Aldrich) and potassium iodide (99.5%, Aldrich) were used as received.

II. Preparation of a Catalyst According to the Invention Based on Functionalized Chitosan The catalyst used in the examples according to the invention was prepared in three steps.

$1^{st}$ step: In a three-necked 250 ml flask, 100 mL of deionized water which is heated to 85° C. were introduced.

Then under stirring, 2 g of chitosan (10.9 mmol of primary amino moieties, 1 eq.) are gradually dispersed in the aqueous solution. 1.65 g of glycidyl trimethyl ammonium chloride (9.79 mmol, 0.9 eq.) and 0.60 g of allyl glycidyl ether (5.26 mmol, 0.48 eq.) are then added dropwise to the reaction medium. The same amounts of these two reagents are added after 24 hours and then after 48 hours of reaction. The reaction was stopped after 72 hours. The reaction medium is precipitated in acetone and dried in a vacuum oven at 45° C. for 48 hours. 2.55 g of a white powder were recovered. The functionalization rates of chitosan primary amine moieties were determined by $^1$H-NMR. The resulting ratio of allyl functions/ammonium functions is 70/30. The compound obtained comprises monomer units of the formulas A' and B2 wherein $X^-$ is chloride anion:

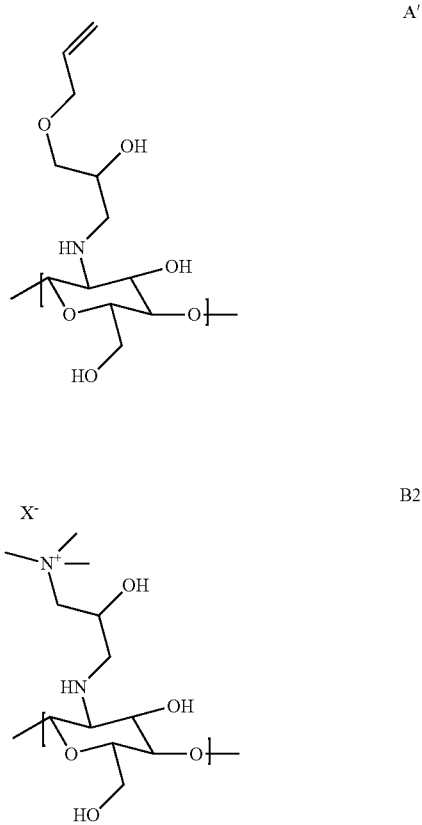

$2^{nd}$ step: 0.5 g of functionalized chitosan (1 eq of allyl functions) obtained in the previous step is dissolved in 20 mL of deionized water by heating the solution to 50° C. After dissolution and cooling to room temperature, 0.1 g of 4,4'-azobis(4-cyanovaleric acid) (about 0.2 eq.) previously dissolved in 2 mL of methanol and 2 g of mercaptopropionic acid (about 15 eq.) are added. After 20 minutes of bubbling with argon, the stirred mixture is heated to 70° C. The reaction is stopped after 20 hours, the pH is adjusted to 5.5 with a sodium hydroxide solution and the polymer is recovered after precipitation in acetone, dissolved in water, precipitated again and then dried in a vacuum oven at 45° C. for 48 hours. 0.47 g of a slightly yellow powder is obtained. $^1$H-NMR showed that the reaction was quantitative (100% conversion of the allyl functions into carboxylic functions). The compound obtained comprises monomer units of the formulas A" and B2:

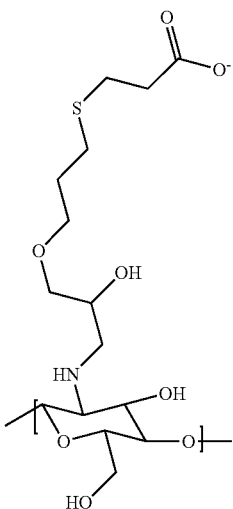

of formulas A″ and B1 (0.125 mmol, 0.6%), and potassium iodide (0.125 mmol) are introduced. Carbon dioxide (7 bar, 99.999%) is then added, and the reaction conducted at 80° C. for typically 2 to 4 hours. The progress of the reaction can be monitored by $^1$H-NMR. At the end of the reaction, the reaction mixture is filtered and distilled to separate the catalyst.

IV. Comparison of the Catalyst According to the Invention to Other Biosourced Catalysts of Cyclic Ether Carbonation In order to highlight the high efficiency of the catalytic system according to the invention, the performance thereof (Example 1) was compared with those of one of the most efficient catalytic systems known, the lecithin/KI system (Comparative Example 1), which also presents the advantage of using a biosourced compound, a soy lecithin. These two catalysts were used in their optimal operating conditions to achieve the standard monoepoxide carbonation under carbon dioxide pressure. Two other catalytic systems based on partially functionalized chitosan were tested (Comparative Examples 2 and 3). Table 1 shows the reaction times and yields obtained for the various tested epoxy substrates.

TABLE 1

| Example | 1 | Comp. 1 | Comp. 2 | Comp. 3 |
|---|---|---|---|---|
| Epoxy Substrate | Catalytic System of the invention 0.6% (a) | Comparative test: Lecithin/KI 1.25% (b) | Comparative experiment: Chitosan functionalized only with the glycidyl trimethyl ammonium chloride 0.8% (c) | Comparative experiment: Chitosan functionalized only with the glycidyl trimethyl ammonium chloride 0.8% + KI 0.8% (a) |
| Allyl glycidyl ether | 98% (2 h)* | 98% (4 h) | 20% (24 h) | 28% (4 h30) |
| Epichlorohydrin | 96% (7 h) | 96% (12 h) | | |

Operating conditions
(a) 7 bar, 80° C.
(b) 20 bar, 100° C.
(c) 15 bar, 80° C. Mol %.
*Results unchanged after 4 recycles of the chitosan part of the catalyst.

-continued

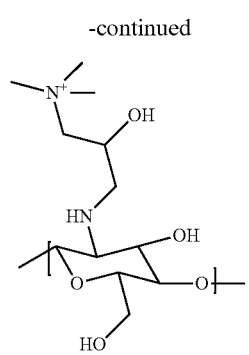

B2

In a 3$^{rd}$ step, the catalyst according to the invention is formed by association in the reaction medium of the precursor compound obtained above with an equimolar amount of a salt of formula MX, such as KI.

III. Procedure of the Catalytic Carbonation Reaction of Cyclic Ethers

In a 50 mL autoclave, cyclic ether (20.83 mmol), the chitosan compound prepared above having monomer units The catalytic system according to the invention comprises monomer units of the formulas A and B, wherein the complexed salt MX is potassium iodide (KI). It allows the carbonation reaction to be conducted under milder conditions, which demonstrates an interesting security aspect. The amounts of catalyst used to achieve complete reaction are halved compared to the catalytic system based on lecithin. The catalysts based on chitosan functionalized only with glycidyl trimethyl ammonium chloride (formation of B type monomer units) lead in turn to low yields, indicating that the simultaneous presence of the A and B monomer units is required.

It was also shown that chitosan part of the catalytic system according to the invention can be repeatedly recycled without loss of activity (after washing with acetone and drying for 18 hours at 40° C. The KI salt can in turn be recovered in the acetone fraction), confirming its very good thermal stability under the conditions of the reaction.

V. Preparation of Polycyclocarbonate by Carbonation of Poly(Cyclic Ether) Catalyzed by the Catalyst According to the Invention Since carbon dioxide is gaseous, the reaction is carried out in a 50 ml Parr Hastelloy autoclave equipped with a pressure gauge, a rupture disc and gas introduction and release valves. An electronic device controls both stirring and heating of the autoclave. 10 g (33.07 mmol) of tri-epoxidized trimethylolpropane, 0.39 mmol of the chitosan compound prepared above having monomer units of the formulas A" and B1 and 64.23 mg (0.39 mmol) of potassium iodide are introduced. The autoclave is then pressurized to 20 bar of nitrogen for 1 hour to check tightness. The device is considered to be sealed if no pressure reduction is noted during the time of observation. The synthesis protocol can then proceed. The nitrogen is discharged and then the autoclave is placed under vacuum for 30 minutes. 7 bar of carbon dioxide are introduced at room temperature (22° C.). The autoclave is then heated to 80° C. and maintained under constant vigorous stirring. The reaction is stopped after 3 hours. The reactor is then degassed and the reaction residue is collected and filtered hot through filter paper. A colorless oil is obtained. 14.08 g (32.41 mmol) of tricyclocarbonate compound are recovered with a yield of 98% and present the characteristic NMR signals described in the literature (cf. European Polymer Journal, 2014, 55, 17-26).

VI. Preparation of a Polyhydroxyurethane Polymer Binder According to the Invention 6 g (13.8 mmol) of polycyclocarbonate prepared in the preceding step and 2.61 g (13.8 mmol, 1 equiv.) of polyamine TEPA (tetraethylene pentamine) are reacted in a silicone mold, at 100° C. for 12 hours and then at 200° C. for 2 hours. The polyhydroxyurethane polymer obtained has a glass transition temperature of 56° C., a THF soluble fraction equal to 1% by weight and a swelling rate of 0.6%, showing its perfect polymerization.

The invention claimed is:

1. Biosourced polymer obtained by functionalization of chitosan in a manner such that it comprises monomer units of formulas A and B:

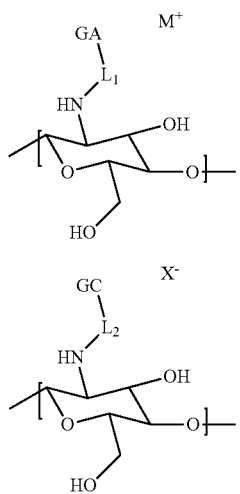

wherein $M^+$ is a cation, $X^-$ is an anion, $L_1$ and $L_2$ are, independently of one another, a divalent group, GA is an anionic group, and GC is a cationic group.

2. Biosourced polymer according to claim 1, wherein GA is the carboxylate group.

3. Biosourced polymer according to claim 1, wherein GC is a quaternary ammonium group.

4. Biosourced polymer according to claim 1, further defined as being obtained by functionalization of chitosan so that it comprises monomer units of formulas A2 and B2:

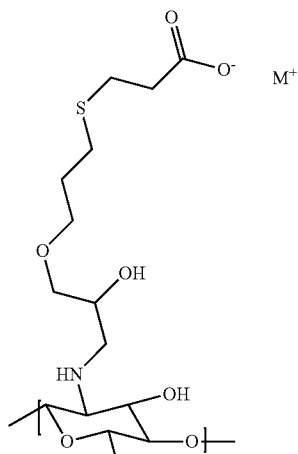

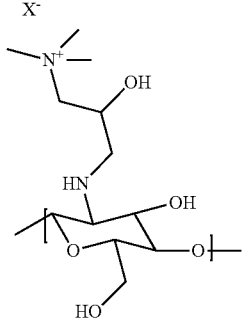

wherein $M^+$ is a cation and $X^-$ is an anion.

5. Biosourced polymer according to claim 1, wherein $M^+$ represents $K^+$ and $X^-$ represents $I^-$.

6. Binder composition for making road construction and/or civil engineering layers and/or coatings, marking products, or sealants or insulating products, comprising a polymer binder of polyhydroxyurethane, derived from the reaction of at least one polyamine with at least one polycyclocarbonate, wherein the polycyclocarbonate was obtained by carbonation of a poly(cyclic ether) with carbon dioxide catalyzed by a biosourced polymer according to claim 1.

7. Binder composition according to claim 6, wherein the poly(cyclic ether) is a poly(epoxide).

8. Binder composition according to claim 7, wherein the poly(cyclic ether) is a diepoxide.

9. Binder composition according to claim 6, wherein the polyamine is a diamine and the polycyclocarbonate is a dicyclocarbonate.

10. Binder composition according to claim 6, wherein the cyclocarbonate groups of the polycyclocarbonate are a 5 or 6-membered ring.

11. Binder composition according to claim 6, wherein the polyhydroxyurethane was formed without using isocyanate reagents.

12. Method for carbonation with carbon dioxide, comprising the following steps:
providing a cyclic ether;
subjecting said cyclic ether to a carbonation reaction with carbon dioxide catalyzed by a biosourced polymer of claim 1, and recovering a cyclocarbonate.

13. Method according to claim 12, wherein the cyclic ether is a poly(cyclic ether) and the cyclocarbonate is a polycyclocarbonate.

14. Method according to claim 13, further comprising the following step:
subjecting said polycyclocarbonate to a polycondensation reaction in the presence of at least one polyamine to obtain a polymer binder of polyhydroxyurethane, said binder comprising a polymer binder of polyhydroxyurethane, derived from the reaction of at least one polyamine with at least one polycyclocarbonate, wherein the polycyclocarbonate was obtained by carbonation of a poly(cyclic ether) with carbon dioxide catalyzed by a biosourced polymer obtained by functionalization of chitosan in a manner such that it comprises monomer units of formulas A and B:

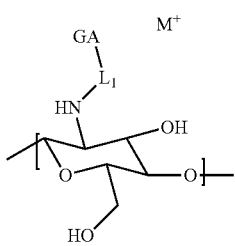

A

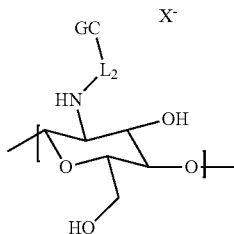

B wherein $M^+$ is a cation, $X^-$ is an anion, $L_1$ and $L_2$ are, independently of one another, a divalent group, GA is an anionic group, and GC is a cationic group.

15. Method according to claim 12, wherein the carbonation reaction is carried out at a temperature of less than or equal to 100° C. under a carbon dioxide pressure of less than 10 bar for less than 4 hours.

16. Material for making road construction and/or civil engineering layers and/or coatings, comprising a binder composition according to claim 6.

17. The material of claim 16, further comprising an aggregate.

* * * * *